United States Patent [19]

Manor

[11] 4,121,108
[45] Oct. 17, 1978

[54] X-RAY FILM MARKING DEVICE AND METHODS OF MAKING AND USING THE SAME

[76] Inventor: George H. Manor, 324 Lanark, St. Louis, Mo. 63137

[21] Appl. No.: 720,669

[22] Filed: Sep. 7, 1976

[51] Int. Cl.² .................. G03B 41/16; G03C 5/16
[52] U.S. Cl. .................... 250/476; 29/527.6; 40/618; 264/271
[58] Field of Search ............... 250/476; 29/527.5, 530, 29/527.6; 264/271; 40/140

[56] References Cited

U.S. PATENT DOCUMENTS

| | | | |
|---|---|---|---|
| 1,795,171 | 3/1931 | Horton | 40/140 |
| 2,105,265 | 1/1938 | Reilly | 264/271 |
| 2,163,695 | 6/1939 | McConnell | 40/140 |
| 3,518,428 | 6/1970 | Ring | 250/476 |
| 3,770,956 | 11/1973 | Johnson | 250/476 |

Primary Examiner—Alfred E. Smith
Assistant Examiner—T. N. Grigsby

[57] ABSTRACT

An x-ray film recording device for recording relevant information on the x-ray film simultaneous with the exposure thereof comprising frame means constructed of material impervious to x-rays such as lead, indicia means constructed of such material disposed within the bounds of said frame means and suspension material operably disposed between said frame and said indicia and operably coupling one to the other.

12 Claims, 7 Drawing Figures

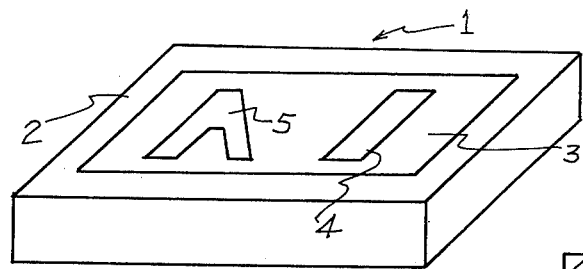
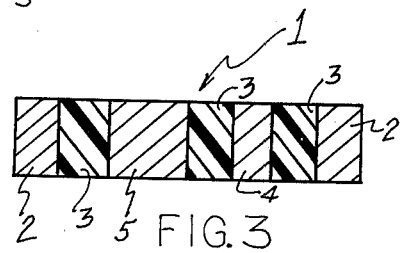
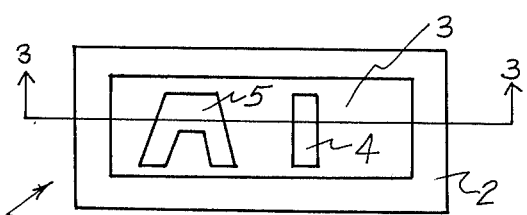
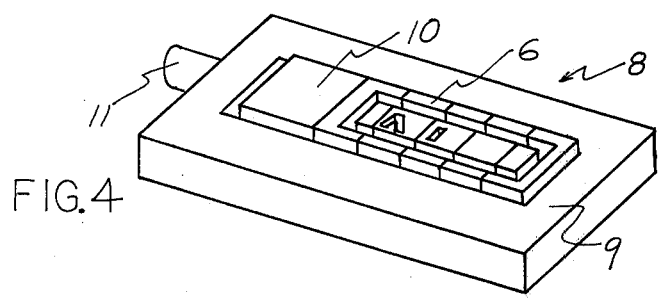
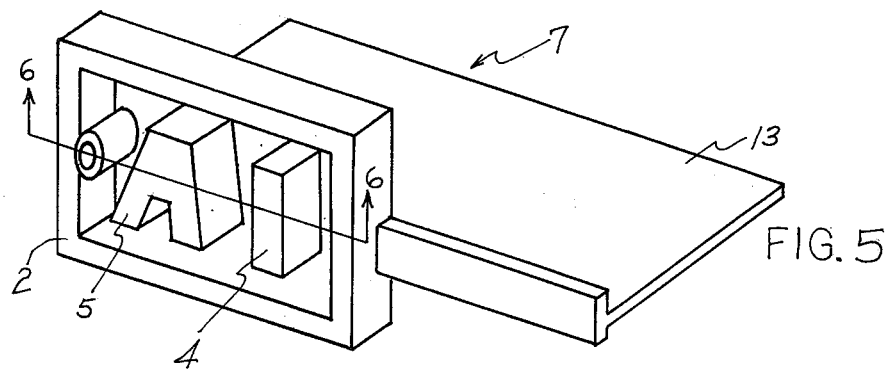
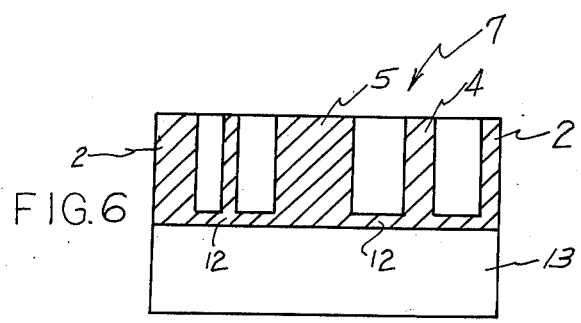

X-RAY FILM MARKING DEVICE AND METHODS OF MAKING AND USING THE SAME

BACKGROUND OF THE INVENTION

A frequently used method of marking identification or legend information on x-ray films and the like is a method wherein metallic characters of some dense material such as lead which is impervious to x-rays are placed on or adjacent to the films before and during exposure. When the films are exposed, the metallic characters prevent x-rays from reaching certain portions of the films corresponding to the shapes of the characters used and the legend information is thereby produced on the x-ray film as unexposed portions thereof. Problems encountered using available devices include blurring and/or diminished boldness of the characters resulting from the use of metallic backing and the like and restriction to devices which contain single characters. Available devices have further limitations with respect to the customary voltage ranges of present day x-ray machines in that at the voltage extremes the image resulting on the negative is unsatisfactory.

SUMMARY OF THE INVENTION

In the present invention a device is contemplated wherein typically a rectangular frame, constructed of an x-ray impervious material such as lead is cast integral with the indicia to be disposed therein. Suitable plastic material, or the like, is disposed or located in the spaces between the indicia and the frame. The product of the foregoing is then machined, removing casting slugs and the like to yield the finished product which consists of the lead frame with lead indicia disposed within the boundaries of the frame and a plastic filler material holding the indicia in place relative to the frame. Further, holes may be provided in the device making it possible for hanging on pegboards and the like for storage.

It is a primary object of the invention to provide such a device which is simply and economically used and manufactured.

A further object of the present invention is to provide such a device which will result in well defined indicia on the x-ray film.

A further object of the present invention is to provide such a device which is readily identifiable and attractive when not in use or in storage.

A further object is to provide a method of producing the marking device which lends itself to ease in manufacture and readily provides multiple character indicia arrayed in plastic which are identifiable and attractive with a minimum of waste of the materials used.

With the above primary and other incidental objects in view which will appear more fully in the specification of the invention which is provided herein, the invention to be protected by Letters Patent consists of the features of construction, the parts and combinations thereof, and the mode of operation hereinafter described or illustrated in the accompanying drawings or their equivalents.

BRIEF DESCRIPTION OF THE DRAWINGS

Referring to the drawings wherein is illustrated a preferred but not necessarily only form of embodiment of the invention.

FIG. 1 is a perspective view of an x-ray marking device constructed in accordance with and embodying the present invention.

FIG. 2 is a plan view of the device in FIG. 1.

FIG. 3 is a sectional view of the device in FIG. 2.

FIG. 4 is a mat used in constructing the device in FIG. 1.

FIG. 5 is a slug prepared in constructing the device in FIG. 1.

FIG. 6 is a sectional view of the slug in FIG. 5.

DETAILED DESCRIPTION OF THE INVENTION

Figure 7:
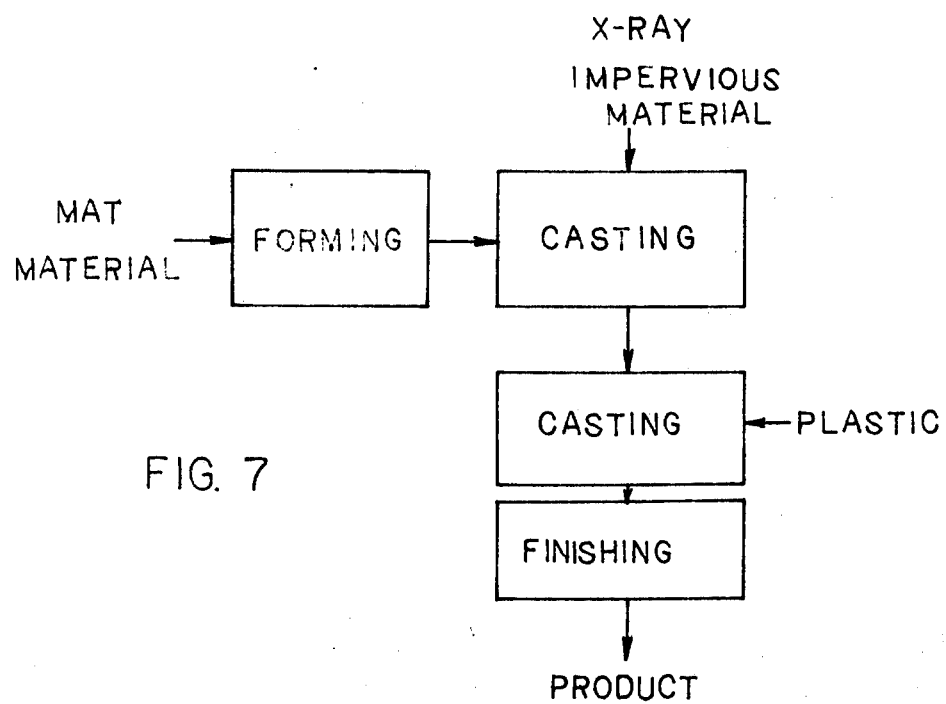
FIG. 7 is a flow chart of the process in accordance with and embodying the present invention.

Referring now in more detail and by reference characters to the drawings which illustrate practical embodiments of the present invention, FIG. 1 is a perspective view of device, 1, constructed in accordance with and embodying the present invention.

As shown in FIG. 1, device, 1, is seen to comprise frame, 2, constructed of an x-ray impervious material such as lead, plastic suspension material, 3, and indicia, 4, and, 5. Further details of device, 1, are shown in FIGS. 2, and, 3, and the method which is used is described herein and illustrated in FIGS. 4, 5 and 6.

In FIG. 4 a mat, 6, is shown which is prepared for the particular device and indicia desired. The material of mat, 6, may be brass when the frame, 2, is to be constructed of lead.

FIGS. 5 and 6 illustrate the intermediate lead product, slug, 7, which results after molten lead has been pumped into a mold containing mat, 6.

As shown in FIG. 4, mat, 6, is shown held in stick, 8, which consists of a steel frame, 9, vise jaw, 10, and vise handle, 11.

As shown in FIG. 5 and FIG. 6, slug, 7, consists of indicia, 4, and, 5, and frame, 2, held together by backwall, 12, and excess lead, 13.

Plastic suspension material, 3, is poured in molten form into slug, 7, which serves as a cavity, filling the spaces between the indicia, 4, and, 5, and frame, 2. The plastic suspension material in the preferred embodiment is colored in a bright color to enhance the appearance and identifiability of the marking device and individual indicia.

It should be readily apparent from the drawings that frame, 2, may be removed and device, 1, and the device used without such a frame and further that individual indicia may be obtained by removing backwall, 12, and excess, 13, prior to filling with plastic, 3.

Thereafter, the excess lead and plastic materials are removed by machining or other suitable process thus yielding device, 1, shown in FIG. 1. It is also clear that after finishing, the bulk of the excess materials are reusable. The process is illustrated in FIG. 7.

While I have illustrated and described the preferred embodiments of my invention, it is to be understood that changes and modifications in the form, construction, arrangement and combination of the parts and steps of the X-Ray Film Marking Device and methods of making and using the same may be substituted for those herein shown and described without departing from the nature and principle of my invention.

Having thus described my invention, what I claim as new and desire to secure by United States Letters Patent is:

1. An x-ray marking device comprising, frame means, indicia means operably disposed within the boundaries of said frame means, said indicia being discrete from said frame means, wherein said indicia extends substantially the full depth of said device, suspension means disposed between said frame and indicia.

2. An x-ray marking device as described in claim 1 wherein said suspension means consists of plastic material.

3. An x-ray marking device as described in claim 1 wherein said frame and indicia are constructed of x-ray impervious material.

4. An x-ray marking device as described in claim 3 wherein said material is lead.

5. An x-ray marking device as described in claim 1 wherein said indicia extends continuously substantially the full depth of said device.

6. An x-ray marking device as described in claim 5 wherein said suspension means consists of plastic material.

7. An x-ray marking device as described in claim 5 wherein said frame and indicia are constructed of x-ray impervious material.

8. An x-ray marking device as described in claim 7 wherein said material is lead.

9. A method for constructing x-ray marking devices which comprise frame means with indicia means disposed within the boundaries of said frame means and suspension means disposed between said frame and indicia, said frame and indicia being of x-ray impervious material comprising forming a mat for the desired indicia and frame, casting x-ray impervious material into the frame and indicia and a backwall which interconnects the frame and indicia, casting plastic between the frame and indicia, removing the excess x-ray impervious material and plastic.

10. A method for constructing x-ray marking devices as described in claim 9 wherein said x-ray impervious material is lead.

11. The product of the method for constructing x-ray marking devices which comprise frame means with indicia means disposed within the boundaries of said frame means and suspension means disposed between said frame and indicia, said frame and indicia being of x-ray impervious material comprising, forming a mat for the desired indicia and frame, casting x-ray impervious material into the frame and indicia and a backwall which interconnects the frame and indicia, casting plastic between the frame and indicia, removing the excess x-ray impervious material and plastic.

12. The product of the method for constructing x-ray marking devices which comprise frame means with indicia means disposed within the boundaries of said frame means and suspension means disposed between said frame and indicia, said frame and indicia being of x-ray impervious material comprising, forming a mat for the desired indicia and frame, casting x-ray impervious material into the frame and indicia and a backwall which interconnects the frame and indicia, casting plastic between the frame and indicia, removing the excess of x-ray impervious material and plastic, wherein said x-ray impervious material is lead.

* * * * *